Sept. 29, 1942.   E. H. WITTENBERG   2,297,378
PRESSURE CONTROL AND INDICATOR GAUGE
Filed July 31, 1941

INVENTOR
EDWARD H. WITTENBERG
By Paul, Paul & Moore
ATTORNEYS

Patented Sept. 29, 1942

2,297,378

UNITED STATES PATENT OFFICE 2,297,378

PRESSURE CONTROL AND INDICATOR GAUGE

Edward H. Wittenberg, Eau Claire, Wis., assignor to National Pressure Cooker Company, Eau Claire, Wis., a corporation of Wisconsin Application July 31, 1941, Serial No. 404,851

3 Claims. (Cl. 137—53)

This invention relates to an improved pressure control and indicator gauge and more particularly to such a device adapted for use in connection with domestic pressure cookers.

An object of the present invention is to provide a pressure control and indicator gauge comprising a plurality of weight members, whereby it is adapted for maintaining different maximum pressures within the cooker body, it being understood that when the pressure reaches a predetermined figure, determined by the weight of said device, the device will be actuated to automatically release excessive internal pressure of the cooker.

A further object is to provide a pressure control and indicator gauge comprising a tubular member, preferably secured to the cover of the cooker, and having a valve seat at its upper end, and a weighted body having a bore therein adapted to be fitted over the upper portion of said tubular member and having a valve member therein normally engaging said seat, and a diaphragm being secured in said body in spaced relation to the valve member and cooperating therewith to provide a chamber, which chamber is in communication with the interior of the cooker body through passages provided in the valve member and said tubular member, and a pressure indicating device being movably supported in the upper portion of said body adapted to be actuated by the diaphragm, when the latter is distorted by pressure received in said chamber.

Other objects of the invention reside in the provision of a pressure control device comprising a body having a valve member therein adapted to engage a seat provided in the upper portion of a tubular member secured to the cover of a cooker, and having a plurality of separate weight members adapted to be fitted over and supported on said body to change the weight characteristics of the device; in the construction of sleeve-like weight members, whereby they may readily be mounted on or be removed from said body, and which sleeve members cooperate to provide a very neat and compact unit which may readily be applied to or removed from the cooker as a single unit; in the construction and arrangement of the pressure indicating element mounted in the upper portion of the pressure control body to indicate the internal pressure of the cooker body; in the provision of a pressure control device of the character described which is substantially fool-proof in operation; and, in the simple and inexpensive construction of the device as a whole, whereby it readily lends itself to quantity production at small cost.

Other objects of the invention will appear from the following description and accompanying drawing and will be pointed out in the annexed claims.

In the accompanying drawing there has been disclosed a structure designed to carry out the various objects of the invention, but it is to be understood that the invention is not confined to the exact features shown as various changes may be made within the scope of the claims which follow.

Figure 1:
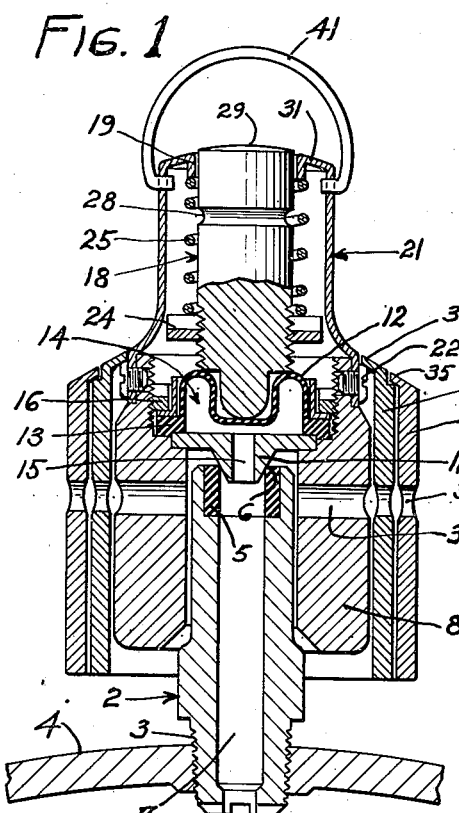
Figure 1 is a vertical sectional view showing the device positioned on the tubular member secured to the cooker body with the parts thereof in normal inoperative position.

The novel apparatus herein disclosed is shown comprising a tubular member, generally designated by the numeral 2, having a threaded lower portion 3 adapted to be received in a wall 4 of a pressure cooker, such as the usual cover thereof. A collar 5 of a suitable material as, for example "Neoprene," is fitted into a recess in the upper portion of the tubular member 2 and provides a valve seat 6. The member 2 has a central bore 7 which communicates with the interior of the cooker body, as will readily be understood by reference to Figures 1 and 2.

The pressure control and indicator gauge, as herein disclosed, is shown comprising a body 8, preferably of metal, having a bore 9 adapted to receive the upper end portion of the tubular member 2, which provides a guide for the body 8. A suitable conical valve member 11 is secured in the body 8 at the upper end of the bore 9 and is adapted to engage the valve seat 6, as clearly illustrated in Figures 1, 2, and 3.

A suitable flexible diaphragm 12, shown having an enlarged annular flange 13, is secured to the body 8 above the valve member 11 and cooperates therewith to provide a chamber 14 which communicates with the bore 7 in the member 2 through a passage 15 provided in the valve member 11. Thus, the chamber 14 is constantly in direct communication with the interior of the cooker body, or other pressure chamber to which the gauge may be applied, through the valve passage 15 and tubular member 2.

The diaphragm may be secured in position by means of a threaded lock ring 16 received in threaded engagement with the body 8 and seated on a flanged collar 17 which, in turn, has its horizontal flange seated on the flange 13 of the diaphragm 12.

A pressure indicating element or plunger, generally designated by the numeral 18, is shown mounted for vertical sliding movement in a suitable guide aperture 19 provided in the upper wall of a housing 21, having its lower portion secured to the upper portion of the body 8 by such means as screws 22. The lower portion of the pressure indicating element 18 is shown provided with threads 23 adapted to receive an adjusting collar or ring 24, which provides an adjustable seat for the lower end of a suitable spring 25, the upper end of which is engaged with the lower edge of the flange 26 defining the guide opening 19.

Figure 2:
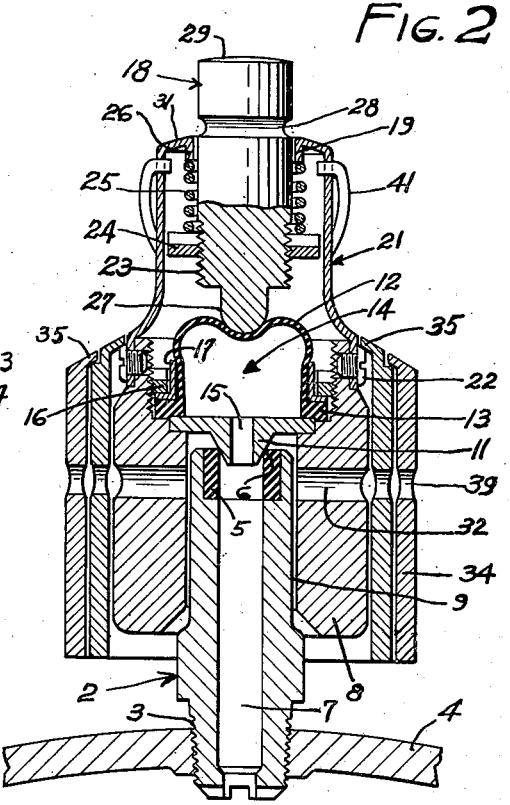
Figure 2 is a similar view showing the pressure indicating element actuated by the diaphragm to indicate the internal pressure of the cooker or other pressure chamber to which the device may be applied.

The pressure indicating element 18 is shown provided with a reduced lower terminal 27 which preferably is semi-spherical in form, and is adapted to engage the diaphragm 12, as clearly illustrated in Figures 1 and 2.

A suitable pressure indicating mark 28, here shown in the form of an annular groove, is provided in the upper portion of the pressure indicating element 18. The bottom of this groove may be painted red or otherwise treated to make it stand out from the rest of the apparatus.

When the device is in its normal position, as shown in Figure 1, the upper convexed surface 29 of the element 18 is preferably substantially flush with the upper wall 31 of the housing 21, as clearly illustrated in Figure 1, as a result of the element 18 being retracted by the action of the spring 25.

When, however, the cooking operation is started, and pressure begins to develop within the pressure cooker body, the diaphragm 12 may subsequently be distorted, as shown in Figure 2, whereby the pressure indicating element or plunger 18 is projected from the upper end of the housing 21, until the pressure indicating groove or band 28 becomes visible above the upper wall of the housing 21. Such projection of the element 18 from the housing will indicate the maximum pressure to be used within the pressure cooker, and the source of heat may then be reduced so as to prevent the pressure control device from "blowing off," which may result if excessive pressure develops within the pressure cooker and causes the valve member 11 to move out of contact with the valve seat 6.

To adapt the device for different pressures, a plurality of sleeve-like weight members, generally designated by the numerals 33 and 34, are provided. The relatively smaller sleeve-like member 33 is adapted to be fitted over the body 8, as clearly shown in Figures 1 and 2, and is supported thereon by an inwardly directed flange 35 provided at the upper end thereof, which engages the heads of the screws 22 securing the housing 21 to the body 8. The weight member 34 is provided with a similar flange 35.

The weight member 33 is preferably provided with an internal horizontal groove 35' and an external groove 36 which are adapted to register with corresponding grooves 37 and 38 provided respectively in the periphery of the body 8 and bore of the relatively larger weight member 34. Suitable apertures 39 are provided in the walls of the weight members 33 and 34 whereby steam or pressure fluid escaping from the tubular member 2 into the bore 9 may escape to the atmosphere through the apertures 32 and 39 as will readily be understood by reference to the drawing. A suitable bail 41 is secured to the upper portion of the housing 21 to facilitate removing the pressure control device as a unit, from the tubular member 2, or applying it thereto.

The tension of the spring 25 is preferably so adjusted that when the pressure cooker is initially started, the internal pressure thereof will gradually project the pressure indicating element 18 from the upper end of the housing 21, until it reaches the position shown in Figure 2, whereby the internal pressure of the cooker will be substantially fifteen pounds, provided, of course, that the weight members 33 and 34 are positioned on the body 8, as shown in Figures 1 and 2. This, however, may be varied by adjustment of the spring retaining nut 24, upon the element 18.

If the internal pressure of the cooker rises beyond fifteen pounds, the entire pressure control device will be elevated, whereby the valve member 11 is moved out of engagement with the seat 6, thereby to permit excessive internal pressure to escape from the cooker into the bore 9, and thence into the apertures 32 and 39 in the body 8 and weight members 33 and 34, respectively. When the outer weight member 34, preferably referred to as the fifteen pound weight member, is removed from the relatively smaller weight member 33, the pressure control device as a unit, will permit steam to "blow off," when the internal pressure of the cooker exceeds ten pounds. In like manner, when the relatively smaller weight member 33 is removed from the body 8, the device is adapted for operation at five pounds, and will permit pressure exceeding five pounds to be released to the atmosphere, as will readily be understood. The simple construction of the novel pressure control and indicating gauge herein disclosed permits it to be manufactured in quantity production at small cost. The device does not require any particular attention on the part of the operator provided, of course, that the proper size weight member is mounted on the body 8.

When the pressure cooker is utilized for canning, it is usually adjusted for operation at five or ten pounds, which is accomplished by removing one or both of the weight members 33 and 34, as the case may be. For various other food articles which may require relatively higher pressures, the weight members 33 and 34 may be seated on the body 8 as shown in Figures 1 and 2, whereupon the pressure indicating element 18 will be projected from the housing 21 sufficiently to show the annular groove or mark 28, when the internal pressure of the cooker reaches approximately fifteen pounds.

Figure 3:
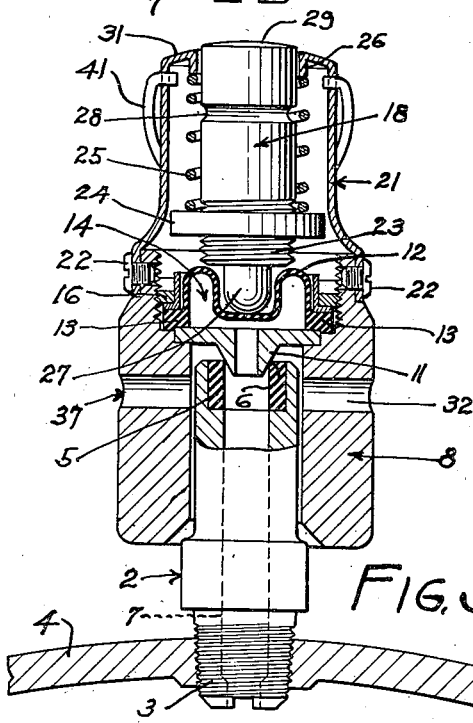
Figure 3 is a view similar to Figure 1, with the additional weight members removed therefrom.
Figure 5:
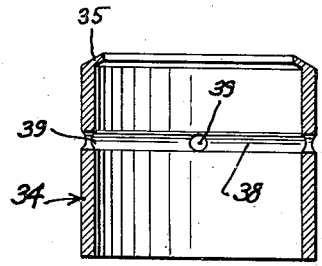
Figure 5 is a similar view showing the fifteen pound weight.
Figure 4:
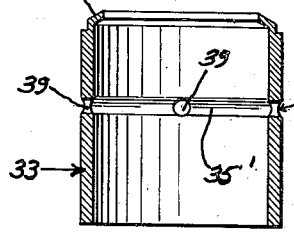
Figure 4 is a view showing the ten pound weight removed from the device.

When the device is used with only the ten pound weight member or without any of the weight members, as shown in Figure 3, the pressure indicating element 18 may not be fully projected from the housing 21, when the pressure unseats the valve member 11 and permits the escape of pressure from the cooker body.

If the device is used most of the time without the weight members 33 and 34 or in other words, for five pounds operation, the spring 25 may be adjusted whereby the pressure indicating band 28 of the element 18 will assume a position above the upper wall 31 of the housing 21, as shown in Figure 2, when the internal pressure of the cooker reaches approximately five pounds.

The pressure control and indicator gauge herein disclosed has been found extremely practical for use in connection with domestic pressure cookers as it provides means for indicating the internal pressure of the cooker body and also for automatically releasing excessive pressure from the cooker, in the event an abnormally high pressure develops therein.

It will be apparent to those skilled in the art that I have accomplished at least the principal objects of my invention, and it will also be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that my invention is not limited thereto.

I claim as my invention:

1. A pressure control and indicator gauge comprising a tubular member adapted to be connected to a source of pressure, a valve seat at the upper end of said member, a weighted body having a bore therein adapted to receive the upper end portion of the tubular member, a valve member fixed in said body and normally engaging said valve seat, an inverted cup-shaped diaphragm secured to the body and valve member and positioned above the valve member and cooperating therewith to provide a chamber, a fluid passage in the valve member constantly establishing communication between said chamber and the tubular member, a housing secured to the upper portion of the body and having a guide opening in its top wall, a pressure indicating plunger mounted within said housing and having its lower end constantly engaging the diaphragm and its upper end guidingly supported in said guide opening, an annular collar adjustably secured to the plunger, a spring interposed between said collar and the top wall of the housing and normally retaining the plunger in retracted position within said housing, said indicator being adapted to be projected from the housing by internal pressure in said chamber, thereby to indicate pressure therein, and a sleeve-like weight removably supported on said body, whereby the gauge may be operated at a reltaively higher pressure.

2. A pressure control and indicator gauge comprising a tubular member adapted to be connected to a source of pressure, a valve seat at the upper end of said member, a weighted body having a guide bore therein adapted to receive the upper end portion of the tubular member, a valve member secured in said body and normally engaging said valve seat, a flexible diaphragm secured to the body and valve member in the leak-proof relation and positioned above the valve member and cooperating therewith to provide a chamber, a central fluid passage in the valve member constantly establishing communication between said chamber and the tubular member, a housing secured to the upper portion of the body and having a guide opening in its upper wall, a pressure indicating plunger mounted within said housing and having its lower end engaging the diaphragm and its upper end guidingly supported in said guide opening, spring means normally retaining the plunger in retracted position within said housing, said plunger being adapted to be projected from the housing by distortion of the diaphragm as a result of pressure in said chamber, thereby to indicate pressure in the chamber, said valve member being adapted to be unseated from said valve seat by excessive pressure in the tubular member.

3. A pressure control and indicator gauge comprising a tubular member adapted to be connected to a source of pressure, a valve seat at the upper end of said member, a weighted body having a bore therein adapted to receive the upper end portion of the tubular member, a valve member in said body normally engaging said valve seat, a flexible walled member having its marginal flange secured to the marginal edge of the valve member in leak-proof relation and cooperating with the valve member to provide a pressure chamber, a fluid passage in the valve member constantly establishing communication between said chamber and the tubular member, and a spring-pressed plunger mounted for sliding movement in the upper portion of said body and having its lower end engaging said flexible walled member, whereby when said flexible walled member is distorted by increasing pressure in said chamber, said plunger is projected from the upper portion of the body to indicate pressure in the chamber.

EDWARD H. WITTENBERG.